Sept. 12, 1950 S. D. ROBERTSON 2,522,402
NEGATIVE RESISTANCE REPEATER SYSTEM
Filed June 18, 1946
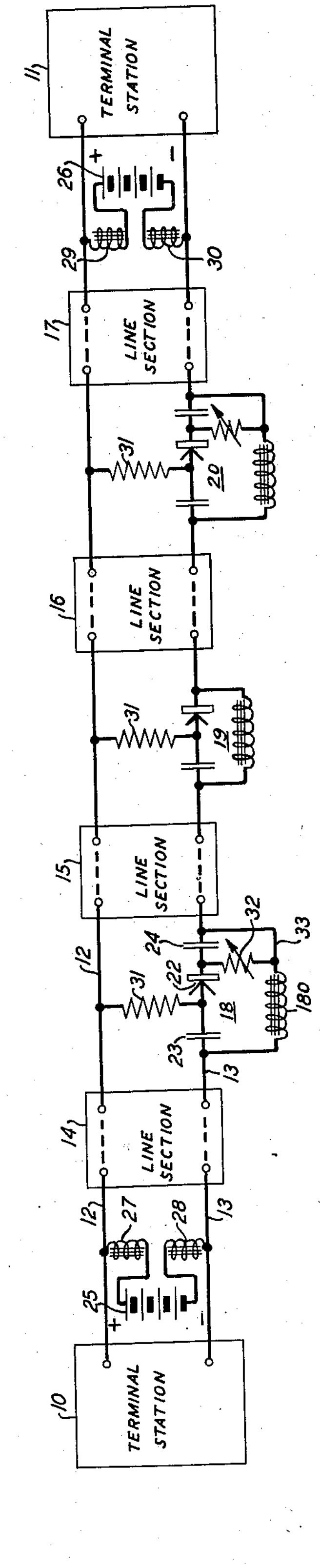
INVENTOR
S.D. ROBERTSON
BY E. V. Griggs
ATTORNEY Patented Sept. 12, 1950 2,522,402

UNITED STATES PATENT OFFICE 2,522,402

NEGATIVE RESISTANCE REPEATER SYSTEM

Sloan D. Robertson, Red Bank, N. J., assignor to Bell Telephone Laboratories, Incorporated, New York, N. Y., a corporation of New York Application June 18, 1946, Serial No. 677,449

6 Claims. (Cl. 178—44)

This invention relates to wave transmission systems and more particularly to long transmission systems having intermediate repeaters of the negative resistance type.

An object of the invention is to supply energizing or polarizing current to mid-line negative resistance repeaters over the same conductors which constitute the principal transmission line.

An additional object of the invention is to supply negative resistance mid-line repeaters of a two-conductor transmission line with energizing current from remote sources over the transmission line in such manner that the current supply at one repeater is substantially unaffected by the other repeaters.

Negative resistance elements utilizing point contact devices of a type produced from high purity silicon are disclosed and claimed in the copending application of R. S. Ohl, Serial No. 580,677, filed March 2, 1945, now United States Patent No. 2,469,569, granted May 10, 1949, for Point Contact Negative Resistance Devices. Among the advantages of such devices in a long transmission system are freedom from space current tubes with their attendant maintenance costs. In the specification which follows it will be understood that the negative resistance devices may be of any desired type but are preferably of the high purity silicon type disclosed and claimed in the Ohl specification to which reference has been made.

In accordance with this invention an electrically long wave transmission system, the conductors of which present such attenuation between the terminals of the system as to make desirable the use of mid-line repeaters or amplifiers is provided at intervals along its length with amplifiers of the point contact negative resistance type to which reference has been made. These amplifiers require energizing current and for that purpose current sources are provided at the terminal stations. The same two-line conductors which serve for wave transmission and with respect to which the wave repeaters effectively are connected in tandem function also to supply energizing current from the terminal station current sources to the point contact devices. The connections at the repeater stations are such that the point contact devices are each connected in shunt across the energizing current supply circuit so as substantially to be unaffected by the other devices.

The drawing is a schematic diagram of one form of long electrical wave transmission system constituting an embodiment of the invention.

As shown in the drawing two widely separated terminal stations 10 and 11 are connected by a two-conductor transmission line 12, 13 which is sufficiently long to present very considerable attenuation for waves to be transmitted thereover. The line as a whole may be broken up into several sections represented by blocks 14, 15, 16 and 17 each of such length that waves of normal transmission level will be so attenuated in traversing the section as to require amplification before passing to the next section if satisfactory transmission is to be maintained. Between each contiguous pair of line sections a two-way repeater circuit such as 18, 19, 20 may be connected. Accordingly, modulated or modified electric waves serving to transmit communications or control functions originating at one terminal traverse the line sections in succession and after attenuation are augmented in energy by the intervening repeaters so as finally to arrive at the remote terminal station with satisfactory volume.

The repeater stations comprise similar circuits. Repeater 18 includes a negative resistance point contact device 22 preferably of the pure silicon type disclosed in the Ohl application to which reference previously has been made. The negative resistance device is introduced serially in the conductor 13 between large capacitance elements 23 and 24 which present very low impedance for alternating currents even of relatively low frequency. When suitably polarized by a steady unidirectional electromotive force any change in current through the device causes the electromotive force across the device to change very rapidly in such a manner as effectively to reduce the net impedance of the series system in which it is connected.

Polarization or direct current energization of the negative resistance device is effected by current transmitted over the line conductors 12 and 13 by unidirectional current sources 25 and 26 at the terminal stations 10 and 11 with which are associated the series choke coils 27, 28, 29 and 30 which exclude variable currents and hence preclude any vitiation of the wave transmission by the shunt paths through the unidirectional current sources. At the repeater station the polarizing path may be traced from conductor 12 through a high shunt resistor 31 of sufficient magnitude so as not to impose a serious loss on the wave transmission, the negative impedance element 22 and a variable resistor 32 in shunt to the capacitor 24 and thence through a choke coil 180 to the conductor 13. The resistors 31 and 32 together are so designed as to impress a proper polarizing electromotive force upon the negative impedance device.

Resistance element 31 may be of a given fixed magnitude at each repeater station. Element 32 may be made variable to enable the negative resistance condition to be had irrespective of the unidirectional voltage which may obtain between conductors 12 and 13 at a particular station. At such a station as 19 near the middle of the line it may be possible to dispense with resistor 32 and the capacitor 24 but all the repeaters may be made identical if desired and each may be adjusted to its particular line voltage by means of the variable resistor 32. A unidirectional current path for the remaining repeaters passes from conductor 12 to conductor 13 through the by-pass 33 and the choke coil 180.

It will be apparent that the circuit embodying the invention makes it possible to energize the mid-line repeaters from terminal station current supply sources, the condition and performance of which may be systematically inspected and controlled. It also makes it possible for the two-wave transmission conductors to serve also as the energizing current supply circuit and, moreover, to supply energizing current to the repeater stations over shunt paths which are substantially independent of each other.

What is claimed is:

1. A transmission system comprising two electrically long conductors over which communication currents may be transmitted, a plurality of negative resistance elements included in series in said system and spaced at intervals corresponding to a substantial degree of attenuation for compensating for said attenuation and means for supplying unidirectional energizing current to said elements over said system, the elements being connected in parallel to said conductors with respect to the unidirectional current supply means and being connected in series to said conductors with respect to the communication currents transmitted over the conductors.

2. A negative resistance repeater for effectively annulling the attenuation of a pair of wave transmission conductors comprising a point contact negative resistance element and a large capacitance capacitor connected in series in one of said conductors, a resistor connected in a path from the common junction point of said element and capacitor to the other of said conductors and a unidirectional path including a choke coil connected in parallel to a short portion of the first-mentioned conductor which includes the negative resistance element and capacitor, said choke coil being conductively connected to the element to permit supply of unidirectional polarizing current to the element through said resistor and choke coil.

3. A wave transmission system comprising a pair of electrical wave conductors for transmission of waves thereover, a negative resistance point contact device intercalated between two capacitors in series in one of the conductors, a highly inductive unidirectional current path connecting the remote terminals of the capacitors, individual resistors connected to each terminal of the negative resistance device to provide a unidirectional current path therefor, the first said resistor having its other terminal connected to the other of said conductors and the second resistor having its other terminal connected to said one conductor at such a point as to connect said resistor directly in shunt to the electrically adjacent capacitor.

4. A wave transmission system comprising two transmission conductors, a plurality of widely separated repeater stations connected to said conductors at intervals throughout their length, each of said stations comprising a negative resistance device intercalated in said system in series with said conductors to amplify energy of waves transmitted thereover, means for transmitting unidirectional polarizing current over said conductors, means for by-passing the unidirectional current at each station around the respective negative resistance device, and a unidirectional polarizing current supply path at each station electrically opaque to waves to be transmitted over said line connected in shunt to said conductors and including the negative resistance device of the respective repeater station and a variable resistor whereby the polarizing current at each station may be individually set at the proper value irrespective of the magnitude of polarizing current supplied to the resistance devices at other stations.

5. In combination, two widely separated electrical wave transmission terminal stations, a two-conductor line system connecting said stations to transmit alternating current signals therebetween, a plurality of amplifiers connected in tandem in said line and physically separated from each other and from the terminal stations by line sections presenting considerable attenuation for the alternating current signals transmitted thereover, each of said amplifiers comprising an electrically polarized silicon contact device having negative resistance properties and means for supplying said amplifiers with polarizing unidirectional current over said two-conductor line from a terminal station, said contact devices being connected effectively in shunt across said two-conductor line for unidirectional current, to receive said polarizing current from said line, and being connected in series in said two-conductor line in the alternating current signal path thereover.

6. A wave transmission system comprising a wave transmitting station, a wave receiving station remote therefrom, a two-conductor transmission line connecting the receiving station to the transmitting station, a plurality of repeaters each including an electrically polarized point contact device, having a negative resistance characteristic, disposed along said line at intervals such that the intervening sections of the line present considerable attenuation for the wave to be transmitted thereover, means connecting the repeaters in tandem with said sections to repeat and amplify waves from each section to a contiguous section, and means connecting the point contact device at each repeater effectively in shunt across the two-conductor line for receiving unidirectional polarizing current from said line and connecting the point contact devices of the various repeaters in series for the alternating current waves transmitted over the line.

SLOAN D. ROBERTSON.

REFERENCES CITED

The following references are of record in the file of this patent:

UNITED STATES PATENTS

| Number | Name | Date |
|---|---|---|
| 1,987,440 | Habann | Jan. 8, 1935 |
| 2,101,699 | Baesecke et al. | Dec. 7, 1937 |